United States Patent
Stelmar Netto et al.

(10) Patent No.: US 11,132,181 B1
(45) Date of Patent: Sep. 28, 2021

(54) COMPUTER ENHANCED AND AUTOMATIC COMPUTER-GENERATED INTEGRATED DEVELOPMENT ENVIRONMENT RECONFIGURATION

(71) Applicant: International Business Machines Corporation, Armonk, NY (US)

(72) Inventors: Marco Aurelio Stelmar Netto, Sao Paulo (BR); Thiago Bianchi, Sao Carlos (BR); Thiago Roberto Fontes Iunes, Santos (BR); Ana Paula Brambila, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/942,777

(22) Filed: Jul. 30, 2020

(51) Int. Cl.
  *G06F 9/44* (2018.01)
  *G06F 8/33* (2018.01)
  *G06F 16/906* (2019.01)
  *G06F 8/70* (2018.01)

(52) U.S. Cl.
  CPC ............. *G06F 8/33* (2013.01); *G06F 8/70* (2013.01); *G06F 16/906* (2019.01)

(58) Field of Classification Search
  None
  See application file for complete search history.

(56) References Cited

U.S. PATENT DOCUMENTS

| | | | |
|---|---|---|---|
| 6,560,592 B1 | 5/2003 | Reid | |
| 7,562,344 B1 | 7/2009 | Allen | |
| 7,734,685 B2 * | 6/2010 | Cheng | G06Q 10/10 709/203 |
| 7,865,875 B2 | 1/2011 | Hockenberry | |
| 8,645,341 B2 * | 2/2014 | Salman | G06Q 30/06 707/695 |
| 9,383,973 B2 | 7/2016 | Villar | |

(Continued)

FOREIGN PATENT DOCUMENTS

| | | |
|---|---|---|
| CN | 101416164 A | 4/2009 |
| CN | 110347570 A | 10/2019 |

OTHER PUBLICATIONS

"Capra", projects.eclipse.org, last printed Jun. 4, 2020, 7 pages, <https://projects.eclipse.org/proposals/capra>.

(Continued)

*Primary Examiner* — Anna C Deng
(74) *Attorney, Agent, or Firm* — Erik C. Swanson (57) ABSTRACT

A computer system for configuring an Integrated Development Environment display is provided. The computer system receives a list of system artifacts that is categorized by at least one artifact type and indexed by affected source code elements. In response to a user beginning an IDE session, the computer system assigning an impact relevance threshold to the user and, in response to the user selecting a source code element, the computer system identifies artifacts from the list of artifacts that affect the selected source code element. The computer system, in accordance with impact values assigned to the artifact types for the source code element, selects from the identified artifacts, a set of display artifacts having assigned impact values that meet or exceed the impact relevance threshold assigned to the user. The computer system the set of display artifacts on an IDE display element.

20 Claims, 6 Drawing Sheets

(56) References Cited

U.S. PATENT DOCUMENTS

| | | | |
|---|---|---|---|
| 9,436,738 | B2 | 9/2016 | Ehsani |
| 9,600,244 | B1 | 3/2017 | Hwang |
| 9,733,933 | B1* | 8/2017 | Arquero .................... G06F 8/71 |
| 10,372,426 | B2 | 8/2019 | Anders |
| 10,924,347 | B1* | 2/2021 | Narsian ............... G06F 11/1446 |
| 2002/0120917 | A1 | 8/2002 | Abrari |
| 2005/0204340 | A1 | 9/2005 | Ruminer |
| 2006/0293934 | A1* | 12/2006 | Tsyganskiy ........ G06Q 30/0201 705/7.29 |
| 2006/0293935 | A1 | 12/2006 | Tsyganskiy |
| 2012/0089964 | A1 | 4/2012 | Sawano |
| 2017/0024311 | A1 | 1/2017 | Andrejko |

OTHER PUBLICATIONS

"Development errors and stuck tricky situation resolution using Cognitive Feedback", An IP.com Prior Art Database Technical Disclosure, Disclosed Anonymously, IP.com No. IPCOM000254832D, IP.com Electronic Publication Date: Aug. 8, 2018, 6 pages, <https://priorart.ip.com/IPCOM/000254832>.

Charalamipidou, et. al., "Integrating Traceability within the IDE to Prevent Requirements Documentation Debt", 2018 44th Euromicro Conference on Software Engineering and Advanced Applications, pp. 421-428, <https://ieeexplore.ieee.org/document/8498242>, Year 2018.

Coyle, et al., "Enhanced Document Traceability for Development of Complex High-Integrity Software-Systems", ARC, AIAA Meeting Paper, Infotech© Aerospace, Sep. 26, 2005-Sep. 29, 2005, Abstract Only, 1 page, <https://arc.aiaa.org/doi/pdf/10.2514/6.2005-6929>.

Mell et al., "The NIST Definition of Cloud Computing", National Institute of Standards and Technology, Special Publication 800-145, Sep. 2011, 7 pages.

Salem, Ahmed, "A Model for Enhancing Requirements Traceability and Analysis", (IJACSA) International Journal of Advanced Computer Science and Applications, vol. 1, No. 5, Nov. 2010, pp. 14-21.

Walters et. al., "Capturing Software Traceability Links from Developers' Eye Gazes", ICPC 2014: Proceedings of the 22nd International Conference on Program Comprehension, Jun. 2014, pp. 201-204, <https://dl.acm.org/citation.cfm?id=2597008.2597795>.

* cited by examiner

COMPUTER ENHANCED AND AUTOMATIC COMPUTER-GENERATED INTEGRATED DEVELOPMENT ENVIRONMENT RECONFIGURATION

BACKGROUND

The present invention relates generally to the field of computer-generated integrated development environments (IDE) used in software coding and testing, and more specifically, to a method of reconfiguring elements of an IDE used in the production of enterprise-level software.

Integrated development environments present, via a computer with a display, multiple cooperative display elements to a user responsible for developing and testing a software system (e.g., a software developer, or tester, etc.) during the software development process. IDEs are helpful for coding and debugging, showing syntax and other programming language information useful for source code generation. However, in some cases, users do not have the industry perspective required to efficiently develop or test source code of software to meet business goals and provide expected deliverables. Requirements beyond business goals (such as trade regulations, legal topics, environmental concerns, etc.) may vary widely between industries, and it can be difficult for a developer to be aware of topics that affect only a few industries and not others.

Some issues with IDEs usage include large investments of time required for a user to become familiar with desired software behavior needed to follow expected business process flow, generation of errors due to improper code performance, and lack of relevant industry knowledge by the user.

SUMMARY

In embodiments according to the present invention, a computer implemented method to configure an IDE display includes the computer receiving a list of system artifacts categorized by at least one artifact type and indexed by affected source code elements. The computer, in response to a user beginning an IDE session, assigns an impact relevance threshold to the user. The computer in response to the user selecting a source code element identifies artifacts from the list of artifacts that affect the selected source code element. In accordance with impact values assigned to each artifact type for the selected source code element, the computer selects from the identified artifacts, a set of display artifacts with assigned impact values that meet or exceed impact relevance threshold assigned to the user, and the computer displays the set of display artifacts on an IDE display element. In other aspects, the system artifacts may be trouble tickets, use cases, test scenarios, business process model notification elements, and non-static system dependencies. In other aspects of the invention, the impact value is assigned by the computer in responsive to calculations that consider a ticket priority, a ticket severity, and a time to fix said ticket, and a number of reported tickets, an associated quantity, severity, and priority of said use cases and said test scenarios, a quantity of business rules, a quantity of dependencies, a quantity of graph levels, and a graph amplitude associated with an affected source code element. In other aspects, the user impact relevance threshold is assigned by the computer in response to calculations that consider an experience level of the user. In other aspects of the invention, collects a session industry and filters the relevant artifacts by the session industry to generate the set of display artifacts. In other aspects, the user profile is updated by the computer using feedback provided by the user related to the impact and relationship among the selected source code and the set of displayed artifacts. In other aspects, the computer, in response to a determination that selected source code is ready to deliver, prompts the user with a listing of modified artifacts; in response to the user confirming artifacts to be updated, the computer, generates a notification to process owners associated with the artifacts to be updated. In other aspects, the computer assigns the artifacts to clusters grouped by similarity that are established using a predetermined algorithm, and the computer adds artifacts belonging to clusters to which artifacts in said set of display elements are assigned.

In another embodiment of the invention, a system for reconfiguring an integrated development environment (IDE), which comprises: a computer system comprising a computer readable storage medium having program instructions embodied therewith, the program instructions executable by a computer to cause the computer to: receive a list of system artifacts categorized by at least one artifact type and indexed by affected source code elements; responsive to a user beginning an IDE session, assign an impact relevance threshold to said user; responsive to said user selecting a source code element within said IDE, identify artifacts from said list that affect said selected source code element; in accordance with impact values assigned to each of said at least one artifact type for said selected source code element, select from said identified artifacts, a set of display artifacts having assigned impact values that meet or exceed said impact relevance threshold for said user; and display said set of display artifacts on an IDE display element.

In another embodiment of the invention, a computer program product to reconfigure an integrated development environment (IDE), the computer program product comprising a computer readable storage medium having program instructions embodied therewith, the program instructions executable by a computer to cause the computer to: receive, using said computer, a list of system artifacts categorized by at least one artifact type and indexed by affected source code elements; responsive to a user beginning an IDE session, assign using said computer, an impact relevance threshold to said user; responsive to said user selecting a source code element within said IDE, identify using said computer, artifacts from said list that affect said selected source code element; in accordance with impact values assigned to each of said at least one artifact type for said selected source code element, select using said computer, from said identified artifacts, a set of display artifacts having assigned impact values that meet or exceed said impact relevance threshold for said user; and display, using said computer, said set of display artifacts on an IDE display element.

The present invention recognizes the shortcomings and problems associated with known IDEs and provides a method of modifying IDE configuration files to provide enhanced display enhancements (including highlighted code elements, customizable warnings, notifications, and hints useable during coding and software testing) that give enhanced system perspective for a user. The enhancements are related to the industry of a selected, active project, are business-process aware, are grouped according to identified relevance clusters, and are scaled to match user experience level, industry familiarity, and usage feedback. These enhancements give a user of an IDE according to aspects of the present invention increased perspective during the coding and testing cycles. Aspects of the invention provide industry-based information about areas of source coding that often lead to errors (e.g., as shown in error tickets), context for related business process (e.g., as shown through BMP notation), use cases & test scenarios for the application being developed, as well as information regarding related non-static system dependencies which can be difficult to identify through mere analysis of static code. This perspective leads to more accurate results, reduced development costs, and shortened periods of development. According some embodiments, aspects of the invention will process user feedback to further configure IDE elements.

Aspects of the present invention improve IDEs by providing augmented contextual awareness for a developer in a manner not currently available. It is not practical for a developer to be an expert in all areas of development, and aspects of the present invention allow a developer to have real-time cognizance of the system artifact interrelatedness that would otherwise not be possible, thereby leading to more efficient development, reduction in development costs, and increased reliability.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
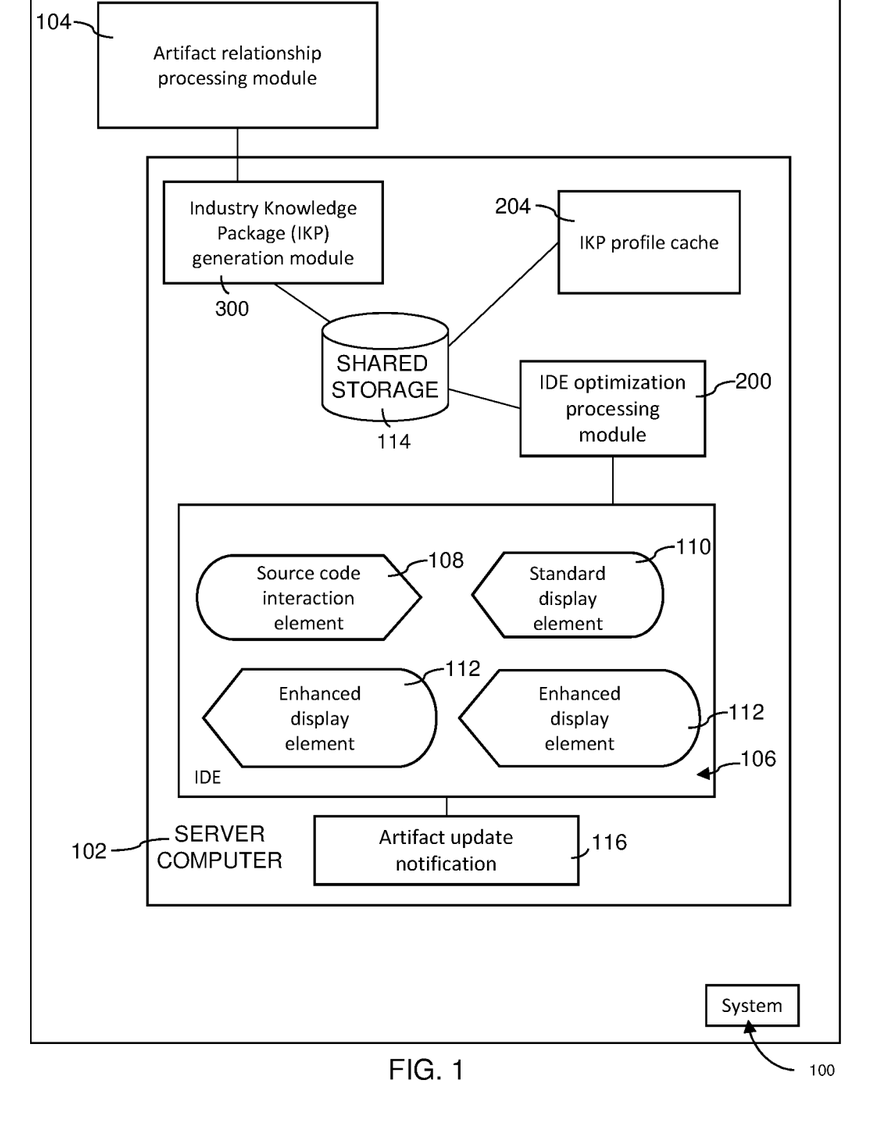
FIG. 1 is a schematic block diagram illustrating an overview of a system for computer-implemented enhancement of IDE display elements.
Figure 2:
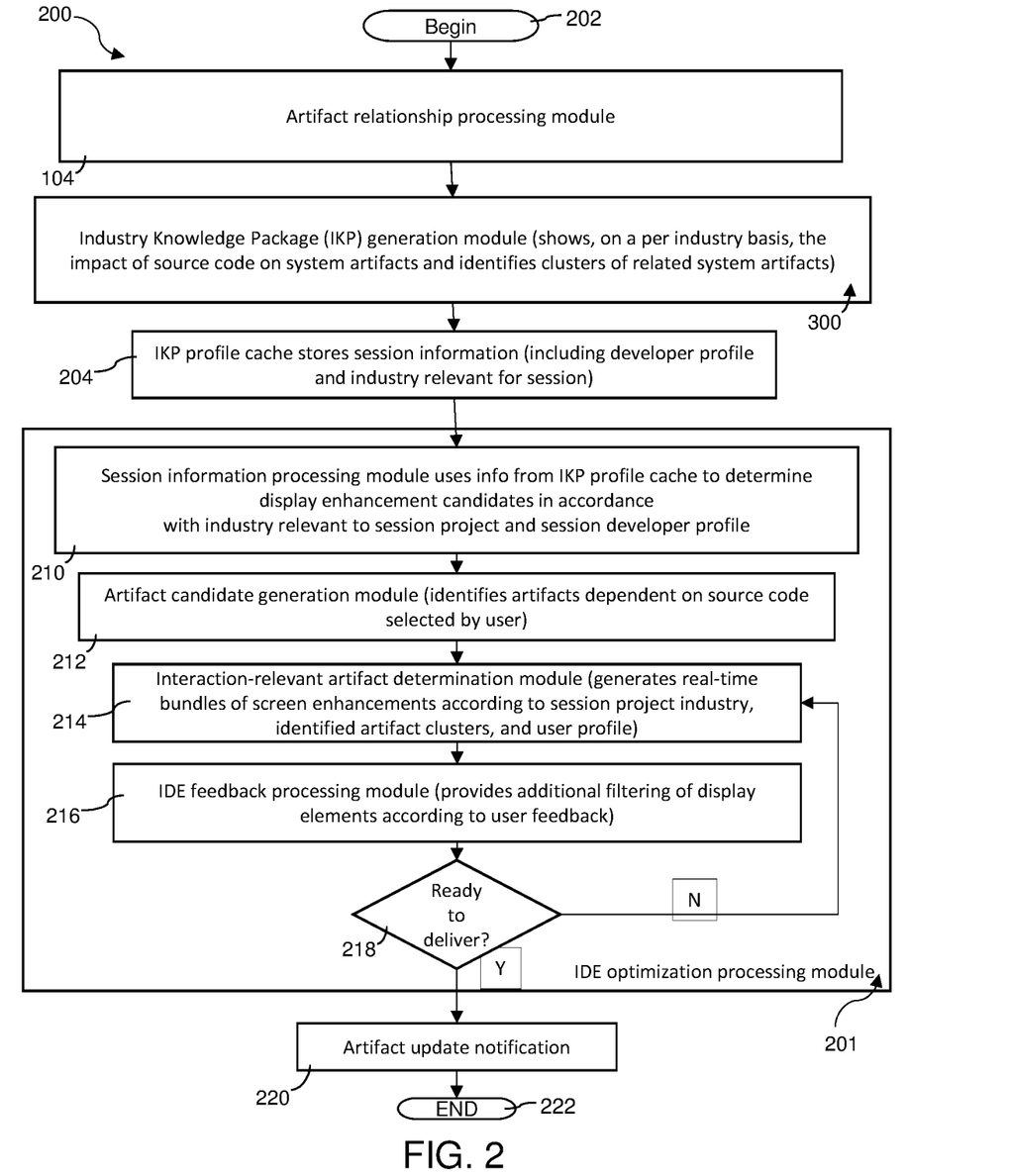
FIG. 2 is a flowchart illustrating a method, implemented using the system shown in FIG. 1, for computer-implemented enhancement of IDE display elements according to aspects of the invention.

Now with combined reference to the figures generally and with particular reference to FIG. 1 and FIG. 2, an overview of a method 200 for reconfiguring an integrated development environment (IDE) is shown. The method 200 is usable within a system 100 as carried out by a server computer 102 that receives source code dependency information from an Artifact Relationship Processing Module (ARPM) 104 that accesses various sources of historic, operational, and process data to produce a list of system artifacts categorized by artifact type and which is indexed by the lines of source code that each artifact affects.

The list of system artifacts is arranged into a Source Code Dependencies Repository (SCDR) 302 (see FIG. 3) that correlates source code elements with several categories or types 304, 306, 308, 310 of system artifacts. According to aspects of the invention system artifacts include error tickets (artifact type 1) 304, use cases & test scenarios (artifact type 2) 306, BPMN diagrams (artifact type 3) 308, and non-static system dependencies (artifact type 4) 310. It is noted that other (or fewer) types of artifacts may be stored in the SCDR as determined by the judgment of one skilled in this art. By relating system artifacts to source code dependencies, aspects of the present invention provide insight to IDE users by, for example, indicating which business rules and processes are impacted by changes in lines of selected source code elements. Additionally, aspects of the present invention can show requirements for the industry to which an active project is related, augmenting the IDE user's perspective, giving context for possibly-overlooked industry nuances and the resultant deliverables associated with targeted source code elements.

With continued reference to FIG. 1, the server computer 102 includes an IDE 106 having source code interaction element 108, standard display element 110, and enhanced display element 112. The server computer 102 has optionally shared storage 114 and receives information from an artifact relationship processing module 104 (described more fully below). Aspects of the server computer 102, including an IDE optimization processing module 201 and an Industry Knowledge Package (IKP) generation module 300 (both described in more detail below) cooperatively generate IDE enhancements 112. According to aspects of the invention, the enhancements 112 are related to an industry associated with a project active within the IDE 106, are business-process aware, grouped according to identified relevance clusters 324, 326, 326 and are selected to match user experience level and usage feedback. In an embodiment, the server computer 102 provides notice 116 regarding artifact modification to respective artifact process owners.

With continued reference to FIG. 2, the IDE enhancement method 200 according to aspects of the invention will now be described. At block 104, the Artifact Relationship Processing Module (ARPM) produces a Source Code Dependencies Repository (SCDR) that correlates source code elements with system artifacts. In particular, the ARPM 104 retrieves tickets from a ticket repository (e.g., Salesforce, Rational Team Center) and registers them in the Source Code Dependencies Repository (SCDR), indexing them by the lines of code affected by each ticket. The ARPM 104 also retrieves use cases a from requirements storage (e.g., the IBM Rational Requirements Composer) and test scenarios from a test case repository (e.g., IBM Rational Functional Tester) and registers them in the SCDR, indexing them by the lines of code affected by each use case/test scenario. The ARPM 104 retrieves appropriate diagrams from the industry BPM repository (e.g., "IBM Business Process Manager on Cloud") and registers them in the SCDR, indexing them by the lines of code affected by each diagram. The ARPM 104 also generates a graph of non-static system dependencies for the system being used (e.g., "IBM Maximo") and registers them in the SCDR, indexing them by the lines of code affected by each non-static dependency.

Figure 3:
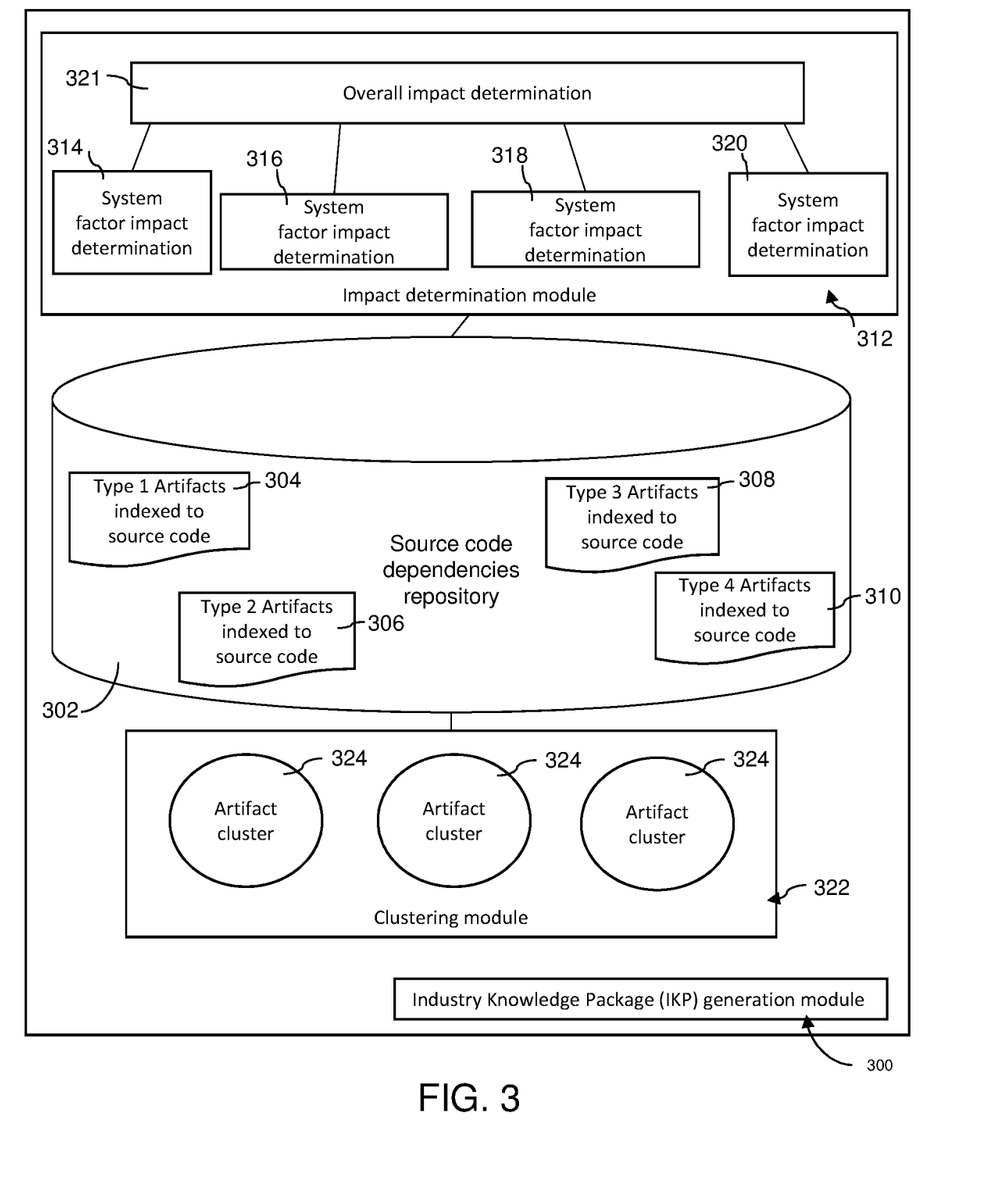
FIG. 3 is a schematic block diagram illustrating elements of the system of FIG. 1 shown in more detail.

An Industry Knowledge Package (IKP) generation module 300 (which will also be described in further detail below) generates an Industry Knowledge Package (IKP) 301 for each source code element. More particularly, the IKP generation module 300 identifies, on a per industry basis, the impact of source code lines on system artifacts (e.g., how strong of a relationship exists between given artifacts and lines of source code). A clustering module 322 within the IKP generation module 300 also identifies related system artifact groups or clusters 324. Each artifact cluster 324 can have artifacts of the various types 304, 306, 308, 310 described above, with each cluster being characterized, for example, by a respective cluster centroid generated in accordance with methods described below. The generated IKP 301 includes a bundle of information for each source code element, including relevant artifacts from the SCDR, artifact impact factors, and an overall system impact (e.g., an average of artifact source code impact factors for artifacts associated with the source code and the various cluster groups 324 to which artifacts associated with the source code element belong). This allows the IDE to provide increased overall perspective to users regarding source code element selected during development and testing. The increased perspective gives an impression of how important a selected source code element is to each kind of artifact (e.g., via artifact impact factors) and to the overall enterprise software system (e.g., via an overall impact factor). According to aspects of the invention, the increased perspective also shows relationships among artifact types relevant to a given code element (e.g., via artifact clustering and including different types of artifacts 304, 306, 308, & 310 from within a given cluster 324 of artifacts). The clustering aspects of the present invention allows the IDE 106 to emphasize relationships between artifacts that are related to each other, even if only one artifact is listed as related to a selected source code element in the SCDR. This allows a user to see relationships between the system source code and system artifacts beyond those shown directly in the SCDR.

With continued reference to FIG. 2, method 200 of the present invention includes an IDE optimization processing module 201 that determines possible enhancement configuring elements, gathers information about a user and active project, notes which code is being actively engaged by a user, and processes user screen interactions to determine which of many available artifact options indexed by source code in the SCDR would be most beneficial to given user interacting with a particular lines of source code. As described below, the IDE optimization processing module 201 simultaneously selects from among all stored artifacts, screen enhancing elements that are simultaneously impacted by a source code element, relevant to a currently-active project, and appropriate for the experience and industry familiarity of a given IDE user.

At block 210 of the IDE optimization processing module 201, the server computer 102 records session information, including active project data and a user profile. In an embodiment of the invention, the active project data identifies an industry associated with a currently-active project, and the user profile includes a user job title and associated level of user expertise, along with an indication of the user's familiarity with the industry associated with the project active in the current IDE use session. and. It is noted that the user profile may also include previous session display preference information for returning users, if the user has given consent for such preferences to be recorded.

At block 212, the server computer 102, in response to a user interacting with source code in the source code interaction element 108, consults the SCDR and identifies all artifacts dependent on the selected source code. In this way, the server computer 102 identifies all possibly-relevant system artifacts that might be useful to give improved context and enhanced perspective regarding how a given source code element selected by the user relates to system artifacts. It is noted that not all artifacts identified as relevant will be displayed to all users. Depending on user profile information, as described below, some relevant artifacts might be filtered from user view. In some aspects of the invention, user profile information is used to compute an artifact impact relevance threshold (AIRT) for the user. In one embodiment, the AIRT is computed by attributing a value to the user experience level (e.g., novice=1, mid-level experience=2, and expert=3) and a value to the user familiarity with the relevant industry (new to industry=1, mid-level familiarity=2, and expert-level familiarity=3) and taking an average of the two values. For example a novice developer operating in an unfamiliar industry would have an artifact impact relevance threshold of (1+1)/2=1, while expert-level developer operating in an unfamiliar industry would have a higher artifact impact relevance threshold of (3+1)/2=2, and an expert level-developer working in a highly-familiar industry would have an even higher artifact impact relevance threshold of (3+3)/2=3. According to aspects of the present invention for a relevant artefact to be shown to the user, the artifacts must have a threshold value equal to or exceeding the artifact impact relevance threshold for the user. As described below, artifacts are given impact factor values of 1, 2, or 3 depending on how important (e.g., how much impact) the given artifact has on a given piece of source code. When determining which relevant source artifacts will be shown to a given user, the impact score of a given category 204, 206, 208, 210 or an overall impact factor determined in block 321 will be compared to the artifact impact relevance threshold of a given user. Less experienced users with lower artifact impact relevance thresholds will see more artifacts (e.g., fewer artifacts will be filtered from them, and artifacts with lower impacts scores will still be shown to those users), while users with higher artifact impact relevance threshold (e.g., higher levels of expertise and industry familiarity) will see fewer relevant artifacts.

In accordance with aspects of the invention, some code-relevant artifacts might by hidden from some users, based on an artifact impact relevance threshold calculated for the user. For example, with reference to FIG. 3, the server computer 120, at block 312 of the IKP generation module 300 identifies a per-artifact impact score 314, 316, 318, 320 for a given line of source code, as it relates to dependent artifacts 304, 306, 308, 310 (as shown in the SCDR). More particularly, the server computer 102 retrieves all tickets 304 from the SCDR that are related to each source code and computes the ticket impact 314 according to factors including (but not limited to) ticket priority, tickets severity, time to fix ticket, and number of reported tickets; it is noted that other impact factors could also be selected and considered by one skilled in this art. Low impact artifacts are given an impact value of 1, mid-level impact artifacts are given an impact value of 2, and high-level impact artifacts are given an impact value of 3. The server computer 102 also retrieves all use cases & test scenarios 306 from the SCDR related to each source code and computes the use case & test scenario impact 316 according to factors including (but not limited to) the number of use cases and test cases, number of tags, severity, and priority; it is noted that other impact factors could also be selected and considered by one skilled in this art. Low impact artifacts are given an impact value of 1, mid-level impact artifacts are given an impact value of 2, and high-level impact artifacts are given an impact value of 3. The server computer 102 also retrieves all BPM diagrams 308 from the SCDR that are related to each source code and computes the BPM diagram impact according to factors including (but not limited to) the number of business rules related to the application that the code has developed; it is noted that other impact factors could also be selected and considered by one skilled in this art. Low impact artifacts are given an impact value of 1, mid-level impact artifacts are given an impact value of 2, and high-level impact artifacts are given an impact value of 3. The server computer 102 also retrieves the graph of non-static system dependencies from the SCDR that are related to each source code and computes the non-static system dependency impact according to (but not limited to) the number of dependencies and the number of graph levels, and graph amplitude; it is noted that other impact factors could also be selected and considered by one skilled in this art. Low impact artifacts are given an impact value of 1, mid-level impact artifacts are given an impact value of 2, and high-level impact artifacts are given an impact value of 3. The server computer 102, at block 322 also averages the individual artifact category impacts 314, 316, 318, 320 and computes an overall impact 321 of all artifacts related to each source code. All of the impact values computed in these impact determination blocks 314, 316, 318, 320, 321 are stored in the IKP generated in the IKP generation module 300.

With continued reference to FIG. 3, the server computer 102 includes a clustering module 322 within the IKP generation module 300 that computes clusters of artifacts and groups them by similarity. In an embodiment of the invention, the server computer 102 uses an algorithm that considers the textual information of each artifact in which the overall focus of the cluster is calculated by considering the focus of the artifacts within it (e.g., via a "k-means" clustering algorithm using a cosine similarity considering the silhouette metric to obtain the best number of clusters). Therefore, IKP can be queried using source code content or lines of source code to retrieve the related artifacts. Related artifacts are considered to be co-located within a given identified cluster if the artifacts have matching cluster centroids. As used herein the term, "matching" means having a similarity of 90% or higher. Therefore, if a first artifact 304 has a first centroid value, and a second artifact has a centroid value that is less than 10% different, then the two artifacts said to have centroid values that match, and the artifacts are deemed to belong to the same cluster 324; it is noted that while three clusters are shown in block 322 for illustration, more or fewer clusters may exist.

In accordance with aspects of the invention, the server computer 102, at block 214, determines which of the artifact candidates identified in block 212 will be shown to a given user. For example, as noted above, display elements corresponding to low impact source code and minor artifact dependencies may be shown to novice developers (e.g., a low impact relevance threshold), but not to users with a profile indicating expert status (e.g., a high impact relevance threshold). However, for users with a profile that indicates high levels of development experience and low levels of experience in the industry related to active project, all relevant artifacts may be presented. Examples of user profile information include (but are not limited to) experience level categories (e.g., junior, senior, specialist, etc.) and job title or user role for the active project (e.g., developer, tester, analyst, etc.).

In some aspects of the invention, selected-code-relevant artifacts may be presented in accordance a user's profile, as well as in accordance with cluster-relevance. That is, once a given artifact has been selected presentation to a user, other artifacts with matching cluster centroids may also be shown to the user, thereby providing perspective regarding code relevance across several kinds of system artefact. For example, if certain tickets are related to a selected source code, then the server computer 102, at block 214, will select other artifacts (e.g., BPM diagram, use cases& test scenarios, or non-static system dependencies, etc.) having cluster centroids that matches the cluster centroid of the tickets identified as code dependent. This arrangement provides broad perspective for a user of an IDE reconfigured in accordance with aspects the present invention.

In accordance with embodiments of the invention, the server computer 102, at block 216 processes user feedback regarding IDE enhanced display elements. If the user provides feedback indicating that certain provided enhancements are either incorrect or unwanted, such feedback is used in conjunction with session information to select which interaction-relevant artifacts will be selected as enhanced display artifacts and presented to the user as the session continues. Examples of user feedback include (but are not limited to) interactions with the IDE elements (e.g., latest files changed, recent artifacts consulted, and non-repetitive (and therefore efficient) or specific input requesting additional related artifacts when one example is presented.

In accordance with embodiments of the invention, aspects of enhanced display elements 112 may include association-clarifying attributes, including bold or contrasting colors in the file editor to highlight the impact of each line of source code, listings of related tickets with summary views, editors of related BPM diagrams, listings of related use cases & listings of related test scenarios. Each (or none) of these association-clarifying display attributes may be incorporated when enhanced display elements 112 (e.g., display artifacts) are presented to a user to further increase perspective regarding the relationship between source code elements and impacted system components.

At block 218, the server computer 102, periodically queries user feedback and IDE interactions for indications that the system is ready for delivery. When the server computer 102, receives such an indication (which can be explicit (e.g., such as by clicking a "ready-to-deliver" interface element) or implicit (e.g., by attempting to close an active project file without making change to the file) is received, the server computer 102 will at block 220 prepare a notification regarding artifacts changed during the session and ask the user to confirm whether the message is correct and if it should be passed along for possible further action to owners of the artifacts requiring user-confirmed changes.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
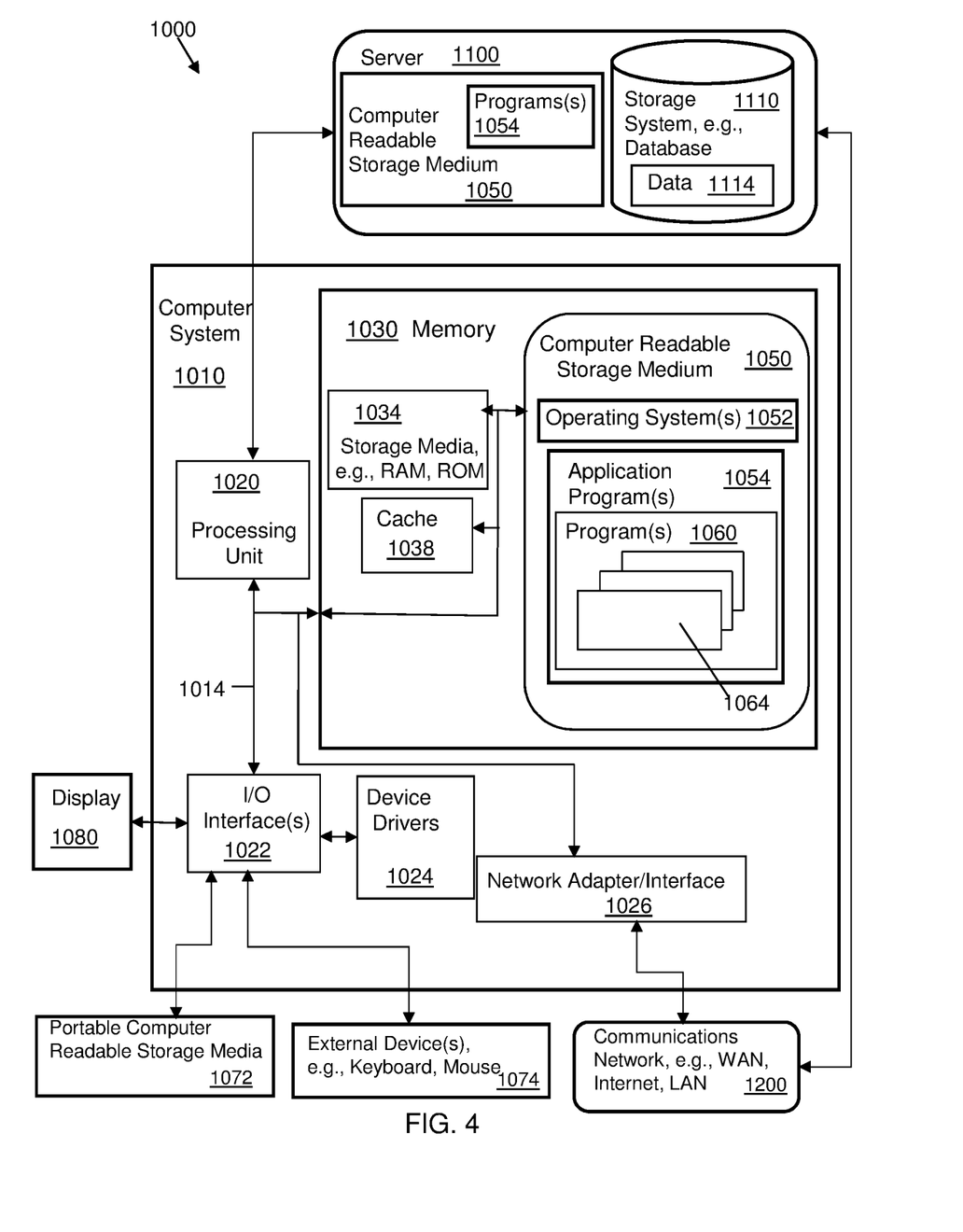
FIG. 4 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 4, a system or computer environment 1000 includes a computer diagram 1010 shown in the form of a generic computing device. The method 100, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that the control system 70 (shown in FIG. 8) can include all or part of the computer system 1010 and its components, and/or the control system can communicate with all or part of the computer system 1010 and its components as a remote computer system, to achieve the control system functions described in the present disclosure. It is also understood that the one or more communication devices 110 shown in FIG. 1 similarly can include all or part of the computer system 1010 and its components, and/or the communication devices can communicate with all or part of the computer system 1010 and its components as a remote computer system, to achieve the computer functions described in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
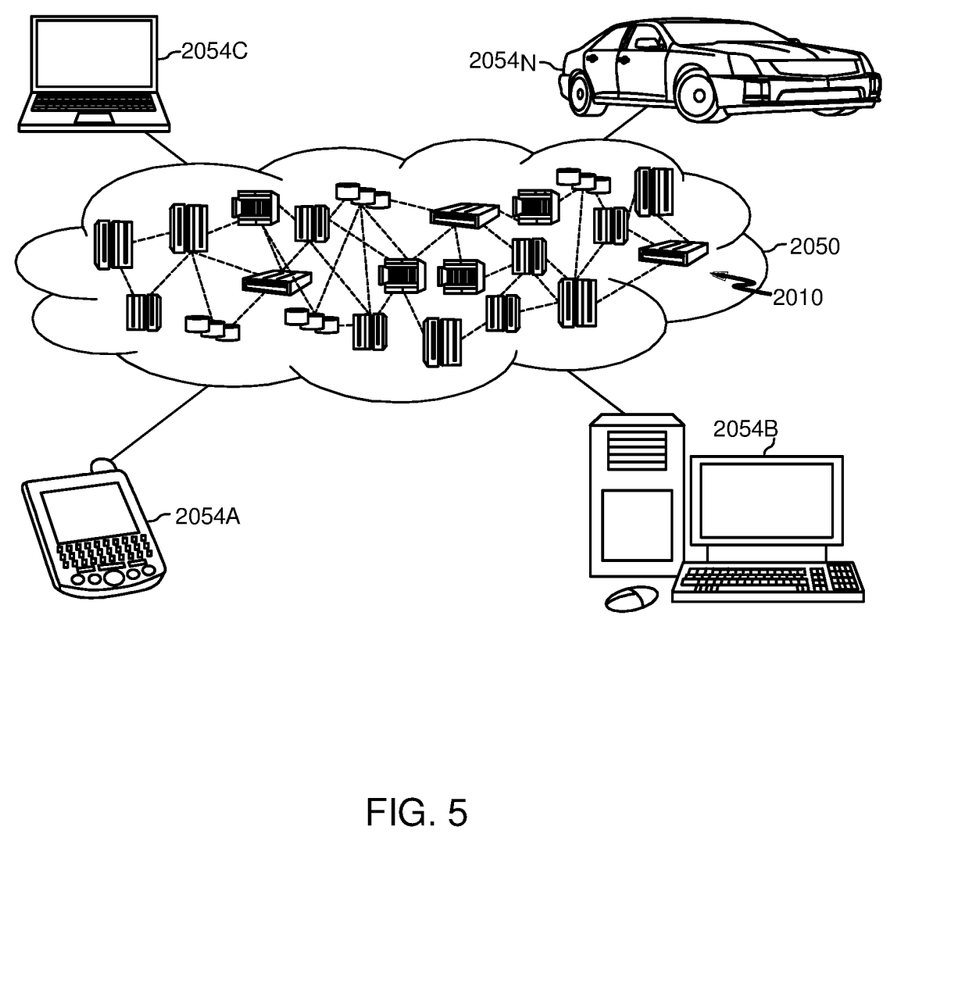
FIG. 5 depicts a cloud computing environment according to an embodiment of the present invention.

Referring now to FIG. 5, illustrative cloud computing environment 2050 is depicted.

As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 5 are intended to be illustrative only and that computing nodes 2010 and cloud computing environment 2050 can communicate with any type of computerized device over any type of network and/or network addressable connection (e.g., using a web browser).

Figure 6:
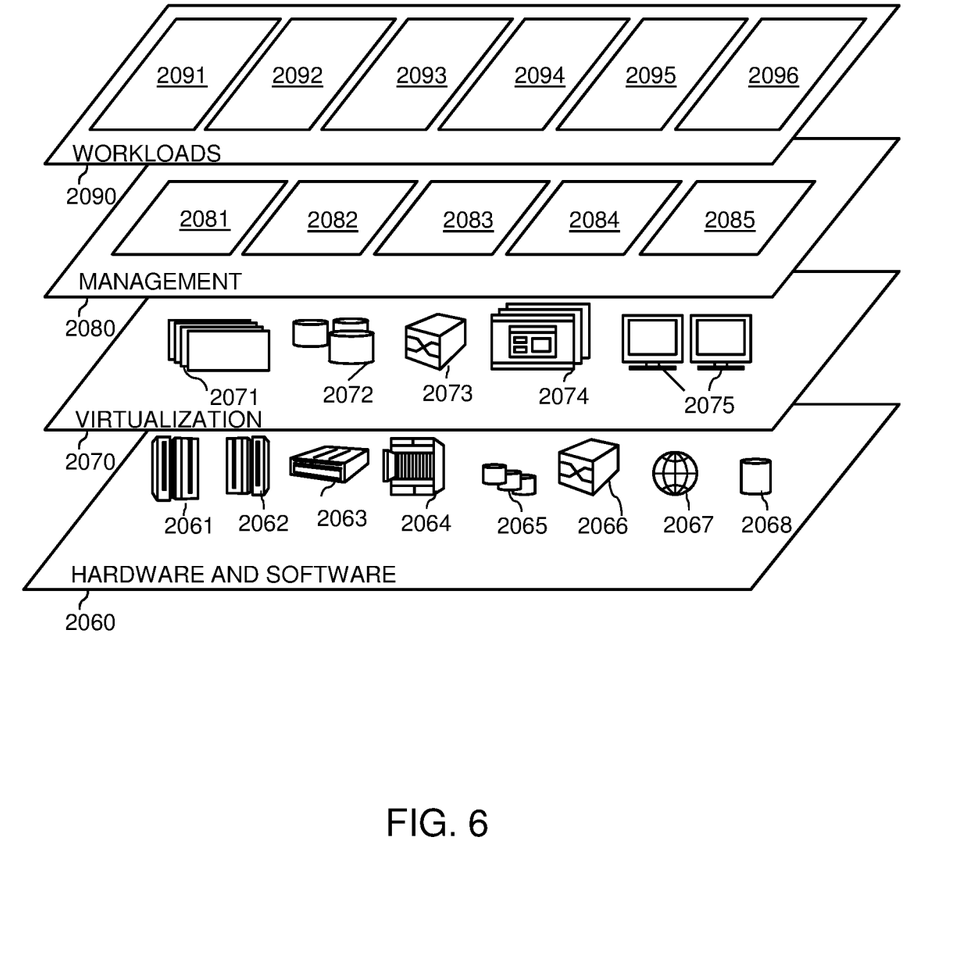
FIG. 6 depicts abstraction model layers according to an embodiment of the present invention.

Referring now to FIG. 6, a set of functional abstraction layers provided by cloud computing environment 2050 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and reconfiguring IDE elements 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method of configuring an Integrated development environments (IDE) display, the method comprising:
  receiving, by a computer, a list of system artifacts categorized by at least one artifact type and indexed by affected source code elements;

responsive to a user beginning an IDE session, assigning by said computer, a user impact relevance threshold to said user;

responsive to said user selecting a source code element within said IDE, identifying by said computer, artifacts from said list of the system artifacts that affect said selected source code element;

in accordance with impact values assigned to each of said at least one artifact type for said selected source code element, selecting by said computer, from said identified artifacts, a set of display artifacts having assigned impact values that meet or exceed said user impact relevance threshold; and displaying, by said computer, said set of display artifacts on an IDE display element.

2. The computer implemented method of claim 1, wherein said at least one artifact type includes trouble tickets and an impact value is assigned by said computer responsive to calculations that consider a ticket priority, a ticket severity, a time to fix said ticket, and a number of reported tickets associated with said affected source code elements.

3. The computer implemented method of claim 1, wherein said at least one artifact type includes use cases and test scenarios and an impact value is assigned by said computer responsive to calculations that consider an associated quantity, severity, and priority of said use cases and said test scenarios associated with said affected source code elements.

4. The computer-implemented method of claim 1, wherein said at least one artifact type includes business process model notification elements and an impact value is assigned by said computer responsive to calculations that consider a quantity of business rules associated with said affected source code elements.

5. The computer-implemented method of claim 1, wherein said at least one artifact type includes non-static dependencies and an impact value is assigned by said computer responsive to calculations that consider a quantity of dependencies, a quantity of graph levels, and a graph amplitude associated with said affected source code elements.

6. The computer-implemented method of claim 1, wherein said system artifacts are trouble tickets, use cases, test scenarios, business process model notification elements, and non-static system dependencies, and an impact value is assigned by said computer responsive to calculations that consider a ticket priority, a ticket severity, and a time to fix said ticket, and a number of reported tickets, an associated quantity, severity, and priority of said use cases and said test scenarios, a quantity of business rules, a quantity of dependencies, a quantity of graph levels, and a graph amplitude associated with said affected source code elements.

7. The computer-implemented method of claim 1, wherein said user impact relevance threshold is assigned by said computer responsive to calculations that consider an experience level of said user.

8. The computer-implemented method of claim 1 further including collecting a session industry and filtering relevant artifacts by said session industry to generate said set of display artifacts.

9. The computer-implemented method of claim 8, wherein said user impact relevance threshold is assigned by said computer responsive to calculations that consider an experience level of said user and a user familiarity with said session industry.

10. The computer-implemented method of claim 1, further including:

updating a user profile, by the computer, using feedback provided by the user related to an impact and relationship among the source code elements and the set of displayed artifacts.

11. The computer-implemented method of claim 1, further including:

responsive to a determination of selected code being ready to deliver, prompting the user by the computer, with a listing of modified artifacts; and responsive to receiving a confirmation of artifacts to be updated from the user, by the computer, generating a notification to process owners associated with said artifacts to be updated.

12. The computer-implemented method of claim 1, further including:

assigning, by said computer, system artifacts to clusters grouped by similarity established using a predetermined algorithm; and adding to said set of display artifacts, by said computer, artifacts belonging to clusters to which artifacts in said set of display artifacts are assigned.

13. A system for configuring an integrated development environment (IDE), which comprises:

a computer system comprising a computer readable storage medium having program instructions embodied therewith, the program instructions executable by a computer to cause the computer to:

receive a list of system artifacts categorized by at least one artifact type and indexed by affected source code elements;

responsive to a user beginning an IDE session, assign a user impact relevance threshold to said user;

responsive to said user selecting a source code element within said IDE, identify artifacts from said list of the system artifacts that affect said selected source code element;

in accordance with impact values assigned to each of said at least one artifact type for said selected source code element, select from said identified artifacts, a set of display artifacts having assigned impact values that meet or exceed said user impact relevance threshold; and display said set of display artifacts on an IDE display element.

14. The system of claim 13, wherein said list of system artifacts is selected from the group consisting of trouble tickets, use cases, test scenarios, business process model notification elements, and non-static system dependencies, and wherein an impact value is assigned by said computer responsive to calculations that consider elements selected from the group consisting of a ticket priority, a ticket severity, and a time to fix said ticket, and a number of reported tickets, an associated quantity, severity, and priority of said use cases and said test scenarios, a quantity of business rules, a quantity of dependencies, a quantity of graph levels, and a graph amplitude associated with said affected source code elements.

15. The system of claim 13, wherein said user impact relevance threshold is assigned by said computer responsive to calculations that consider an experience level of said user.

16. The system of claim 13 further including collecting a session industry and filtering relevant artifacts by said session industry to generate said set of display artifacts.

17. The system of claim 13 further including:

assigning, by said computer, system artifacts to clusters grouped by similarity established using a predetermined algorithm; and adding to said set of display artifacts, by said computer, artifacts belonging to clusters to which artifacts in said set of display artifacts are assigned.

18. A computer program product to configure an integrated development environment (IDE), the computer program product comprising a computer readable storage medium having program instructions embodied therewith, the program instructions executable by a computer to cause the computer to:

receive, using said computer, a list of system artifacts categorized by at least one artifact type and indexed by affected source code elements;

responsive to a user beginning an IDE session, assign using said computer, a user impact relevance threshold to said user;

responsive to said user selecting a source code element within said IDE, identify using said computer, artifacts from said list of the system artifacts that affect said selected source code element;

in accordance with impact values assigned to each of said at least one artifact type for said selected source code element, select using said computer, from said identified artifacts, a set of display artifacts having assigned impact values that meet or exceed said impact relevance threshold for said user; and display, using said computer, said set of display artifacts on an IDE display element.

19. The computer program product of claim 18, wherein said list of system artifacts is selected from the group consisting of trouble tickets, use cases, test scenarios, business process model notification elements, and non-static system dependencies; and wherein said impact value is assigned by said computer responsive to calculations that consider elements selected from the group consisting of a ticket priority, a ticket severity, and a time to fix said ticket, and a number of reported tickets, an associated quantity, severity, and priority of said use cases and said test scenarios, a quantity of business rules, a quantity of dependencies, a quantity of graph levels, and a graph amplitude associated with said affected source code elements.

20. The computer program product of claim 18, wherein said user impact relevance threshold is assigned by said computer responsive to calculations that consider an experience level of said user.

\* \* \* \* \*